Figure 1:
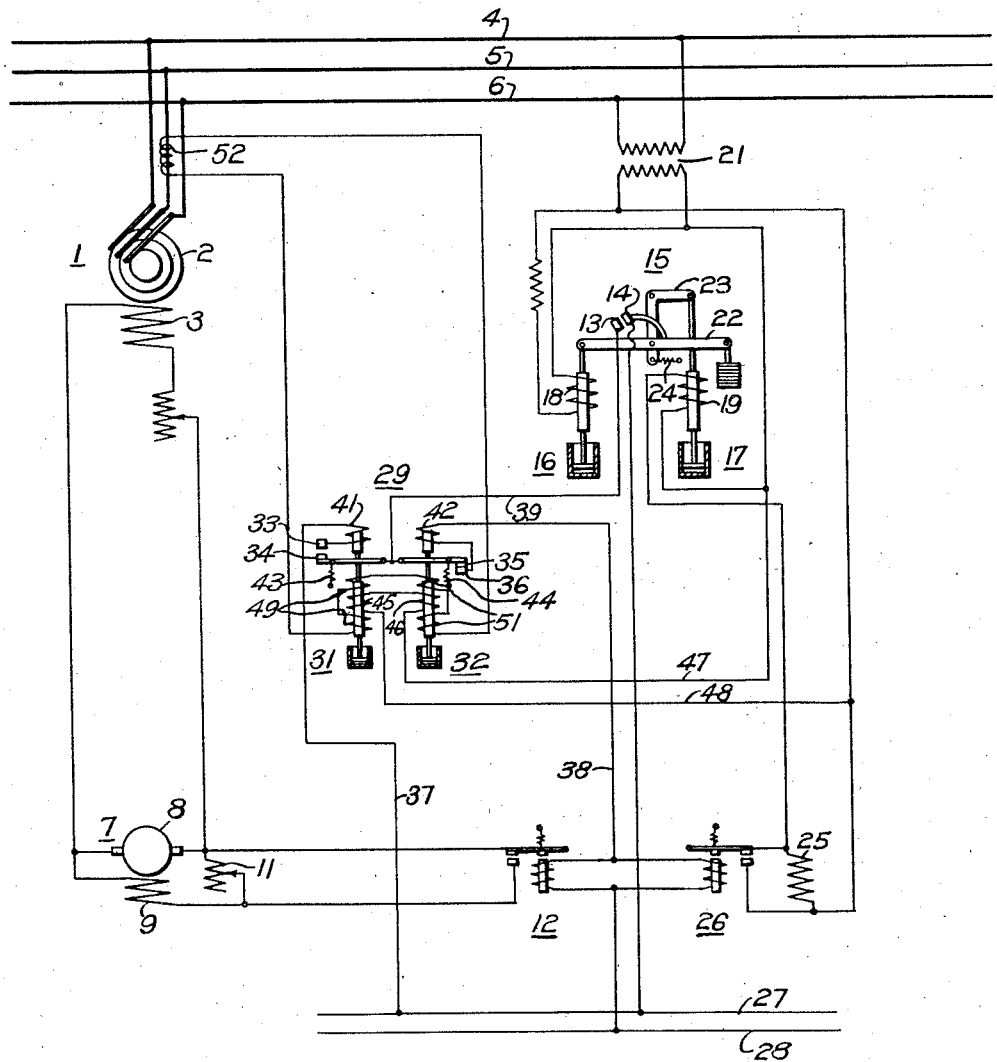

Aug. 16, 1927.

J. H. ASHBAUGH 1,638,819

OVERLOAD PROTECTIVE DEVICE

Filed Aug. 28, 1925

2 Sheets-Sheet 1

WITNESSES:

INVENTOR
John H. Ashbaugh
BY
ATTORNEY

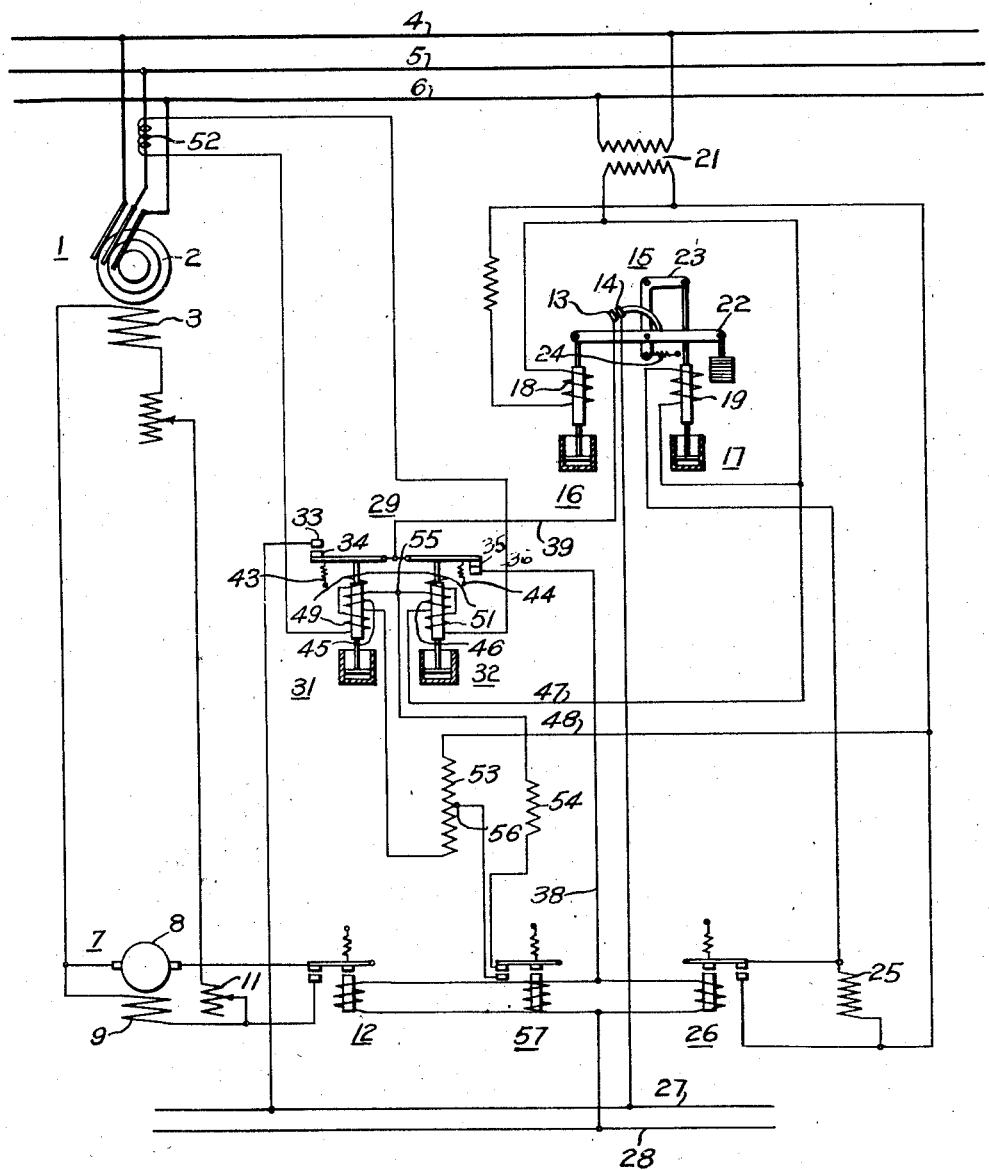

Patented Aug. 16, 1927.

1,638,819

UNITED STATES PATENT OFFICE.

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA.

OVERLOAD PROTECTIVE DEVICE.

Application filed August 28, 1925. Serial No. 53,073.

My invention relates to regulator systems and more particularly to providing regulator systems with means for limiting the electrical power load of a dynamo-electric machine. My invention is particularly applicable to a regulator system for correcting the electrical conditions of a transmission line.

In the operation of transmission lines, it is customary to correct for power-factor variations by the use of a synchronous condenser connected to the power circuit, and to control the excitation of the synchronous condenser by means of a voltage regulator connected to the transmission line. Inasmuch as the voltage rise and drop on the transmission line is a function of the power-factor variation, such voltage regulator may be adjusted to govern the synchronous condenser so as to control the value of leading or lagging current taken from the line in accordance with the power-factor correction required.

The voltage regulator, however, is sensitive only to power-circuit conditions and is not sensitive to the conditions of the synchronous condenser. The excitation of the synchronous condenser may, therefore, be increased or decreased to such degree that the leading or the lagging current taken from the transmission line increases sufficiently to unduly overload the condenser machine.

An object of my invention is to provide a regulator system with means for limiting the ohmic or the reactive power load or a dynamo-electric machine, and it is applicable for limiting the leading or lagging current drawn from a transmission line by a synchronous condenser.

Another object of my invention is to provide such load regulator with means for preventing hunting action in the regulator system.

My invention will be better understood by reference to the accompanying drawing in which, Fig. 1, diagrammatically illustrates one preferred form of the invention, and Fig. 2 diagrammatically illustrates a second preferred form using a vibratory anti-hunting relay for the load-regulating elements.

Referring to the drawing, Fig. 1 illustrates a synchronous condenser 1 having an armature winding 2 and a field winding 3 and connected to a three-phase transmission line 4—5—6. The field winding 3 is connected to an exciter generator 7 that is provided with an armature winding 8 and a field winding 9 in series circuit relation with a resistor 11. A relay 12 is connected to intermittently short-circuit the resistor 11, in accordance with the operation of contact members 13 and 14 of the voltage regulator 15.

The regulator 15 comprises a control magnet 16 and an anti-hunting magnet 17 having actuating windings 18 and 19, respectively, which are energized from a transformer 21 that is connected across the conductors 4 and 6 of the transmission line. The control magnet 16 actuates a lever 22 that carries the contact member 14, and is pivotally mounted upon the lower end of a bell-crank lever 23 that is actuated by the anti-hunting magnet 17 against the pull of a spring member 24. A resistor 25 is provided in circuit with the winding 19 of the electromagnet 17, and a relay 26 is connected to intermittently short-circuit the resistor 25 in accordance with the operation of the regulator contact members 13 and 14. The relays 12 and 26 are both energized from the supply conductors 27 and 28 upon the closure of the regulator contact members.

A load-limiting device 29 is provided for modifying the action of the regulator 15 and comprises a pair of electromagnets 31 and 32. The electromagnet 31, upon being energized is actuated upwardly to close contact members 33 and 34, thus completing a circuit through conductors 37 and 38 in parallel relation to the regulator contact members 13 and 14. The magnet 32, upon being energized so as to be actuated upwardly, separates contact members 35 and 36, which are connected in series circuit relation with the regulator contact members 13 and 14, through conductors 38 and 39.

Anti-hunting magnets 41 and 42 are provided for the load-regulating magnets 31 and 32, respectively, and are operative to force the regulating magnets downwardly. The coil 41 when energized, upon engagement of the contact members 33 and 34, opposes the operation of the magnet 31, and the coil 42 when deenergized, upon the separation of the contact members 35 and 36, opposes the operation of the magnet 32. That is to say, the coil 41, when energized, biases the magnet 31 downwardly and the coil 42, when energized, biases the magnet 42 upwardly. The contact members 34 and 35 are normally held in their lower positions by means of spring members 43 and 44, respectively.

The magnets 31 and 32 are provided, respectively, with voltage coils 45 and 46, which are connected in series circuit relation with each other and, by means of conductors 47 and 48, are adapted to be energized from the transformer 21 in accordance with the voltage of the transmission line. The electromagnets 31 and 32 are also each provided with a pair of differentially wound current coils 49 and 51, respectively, which are connected in series circuit relation with each other, are placed on opposite sides of their respective voltage coils, and are connected to be energized from a current transformer 52, which is connected to the synchronous condenser lead corresponding to the illustrated middle conductor of the transmission line.

The form of the invention illustrated in Fig. 2 is, in general, similar to that of Fig. 1 with the exception of the substitution of different anti-hunting connections for the electromagnets 31 and 32. The anti-hunting electromagnets 41 and 42 of Fig. 1 are omitted in this form of the invention, and the voltage coils 45 and 46 are connected in series circuit relation with a resistor 53. A circuit in shunt to the voltage coil 45 is provided by connecting a resistor 54 between the junction-point 55 of coils 45 and 46 and an intermediate point of the resistor 53 designated by the numeral 56.

A relay 57 has its operating coil connected in parallel circuit relation to the operating coils of the relays 12 and 26, whereby it is actuated intermittently, in accordance with the operation of the regulator 15, to close the circuit through the resistor 54 in shunt relation to the voltage coil 45, thereby reducing the excitation of that coil and increasing the excitation of the series-related voltage coil 46.

The operation of the system illustrated in Fig. 1 is as follows. The voltage regulator 15 operates to vary the excitation of the synchronous condenser 1 to correct for either leading or lagging current upon the transmission line, in accordance with voltage variations of the line that are caused by power-factor variations. The voltage coils 45 and 46 are mounted to have their centers corresponding to the centers of the cores of the electromagnets 31 and 32, so that they normally hold the electromagnets in their mid-positions. The current coils 49 and 51 each comprise a pair of differentially wound coils placed symmetrically with respect to the voltage coils 45 and 46, respectively, which, when energized alone, also tend to hold the cores of the magnets 31 and 32 in their mid-position.

Should the current flowing through the voltage coils 45 and 46 and that flowing through the circuit of the current coils 49 and 51 assume a phase relation of 90° with respect to each other, the coils would have the same effect upon the magnet as though each were energized separately; that is to say, the cores of the magnets would be held in their central position with respect to the energizing coils. It will be noted that the voltage coils 45 and 46 are energized from the conductors 4 and 6 and that the current coils 49 and 51 are energized from the current transformer 52 in accordance with current drawn from the transmission line conductor 5.

The ohmic component of current in the conductor 5 normally has a phase displacement of 90° with respect to the voltage across the conductors 4 and 6, and the reactive component of current in the conductor 5 and in the transformer 52 will have a phase displacement of zero of 180° with respect to the voltage across the conductors 4 and 6, depending upon whether the reactive component of current is leading or lagging. It will be clear, therefore, that the phase relation required to operate the magnets 31 and 32 corresponds to that of the reactive current drawn by the synchronous condenser 1.

Should the current in the transmission line become leading, the voltage of the conductors 4, 5, 6, will rise and the regulator 15 will operate to reduce the excitation of the field winding 3, thus causing the current of the condenser 1 to be lagging. Should the value of this lagging current exceed a safe value, or the value for which the magnet 31 is set to operate, this magnet will be forced upwardly, causing engagement of the contact members 33 and 34, which are in parallel circuit relation to the regulator contact members 13 and 14, and causing the energization of the relay 12 to close the circuit in shunt relation to the resistor 11, thereby raising the voltage of the exciter generator and of the synchronous condenser. As the contact members 33 and 34 are engaged, the current through the circuit of coil 41 causes this coil to urge the magnet 31 downwardly, thus giving an anti-hunting and vibratory action to the magnet.

When lagging current flows in the transmission line 4, 5, 6, the voltage of the line drops and the regulator 15 will, therefore, operate to increase the excitation of the synchronous condenser, thus causing leading current to flow from the transmission line to the condenser. Should the value of this leading current exceed a safe value or that value for which the magnet 32 is adjusted, this magnet will pull upwardly, disengaging the contact members 35 and 36, thereby interrupting the shunt circuit of the relay 12 and causing the voltage of the exciter generator 7 to drop. The anti-hunting coil 42, being normally operative in an upward direction, is deenergized upon the separation of the contact members 35 and 36, so that the action of the spring member 44 tends to again close the circuit through contact members 35 and 36, thus causing the relay 32 to be vibratory in its action. It will be noted that the circuits of the electromagnets 31 and 32 are such that if one of these magnets tends to pull upwardly the other tends to pull downwardly. The magnet 31 pulls upwardly when the current of the condenser is lagging and the electromagnet 32 pulls upwardly when the current of the condenser is leading.

In the form of the invention illustrated in Fig. 2, the operation of the electromagnets 31 and 32 to complete a circuit in parallel relation to the regulator contact members upon engagement of the contact members 33 and 34, and to interrupt the circuit through the regulator contact members upon disengagement of the contact members 35 and 36, corresponds to the operation described with reference to the form of the invention illustrated in Fig. 1.

It will be noted that upon closing the contact members of the relay 57, a circuit is formed in shunt relation to the voltage coil 45 of the magnet 31 and this circuit reduces the resistance value in circuit with the coil 46, so that closing the contact members of the relay 57 decreases the current flowing through the coil 45 and increases the current flowing through the coil 46, while opening the contact members of the relay 57 reverses this relation. The operation of the electromagnet 31 in an upward direction to engage the contact members 33 and 34 causes the contact members of the relay 57 to become engaged and to weaken the excitation of the voltage coil 45, thereby producing an anti-hunting action. Also, the operation of the electromagnet 32 in an upward direction opens the circuit through the contact members 35 and 36 and causes the contact members of the relay 57 to become disengaged, thereby weakening the energization of the voltage coil 46 and producing an anti-hunting action upon the magnet 32.

My invention has been described as applied to limiting the flow of reactive kilovolt amperes, or reactive power to a synchronous condenser, but may be applied to limiting the reactive or the watt component of power of any dynamo-electric machine.

Many modifications of my invention may be made in the circuits and apparatus disclosed without departing from the spirit thereof, and I do not wish to be limited other than by the scope of the appended claims.

I claim as my invention:

1. In a regulator system, a dynamo-electric machine having a field winding, means comprising a regulator for controlling the excitation of said field winding, current-limiting means for said machine for preventing excessive leading current, and current-limiting means for said machine for preventing excessive lagging current.

2. In a regulator system, a dynamo-electric machine having a field winding, regulator means for controlling the excitation of said field winding, current-limiting means for said machine responsive to lagging current thereof, and current-limiting means for said machine responsive to leading current thereof.

3. In a regulator system, a power circuit, a dynamo-electric machine connected to said circuit and having a field winding, regulator means for controlling the excitation of said field winding in accordance with power-circuit conditions, and means responsive to the reactive component of current of said dynamo-electric machine for limiting the operation of said regulator means to prevent overloading said dynamo-electric machine.

4. In a regulator system, a power circuit, a dynamo-electric machine connected to said power circuit and having a field winding, regulator means for controlling the excitation of said field winding in accordance with power-circuit conditions, and means for limiting the operation of said regulator means to limit the reactive power of said dynamo-electric machine, said means comprising means responsive to lagging current of said machine, and means responsive to leading current of said machine.

5. In a regulator system, a dynamo-electric machine having a field winding, a regulator for governing the excitation of said field winding, and means for limiting the power of said machine comprising a pair of relays, one of said relays being operative to increase the excitation of said field winding, and the other of said relays being operative to decrease the excitation of said field winding.

6. In a regulator system, a dynamo-electric machine having a field winding, a regulator for governing the excitation of said field winding, and power-limiting means for said machine, said power limiting means comprising a pair of relays, one of said relays being operative to limit the increase in excitation of said machine, and the other of said relays being operative to limit the decrease in excitation of said machine.

7. In a regulator system, a dynamo-electric machine having a field winding, a regulator for governing the excitation of said field winding, and load-limiting means for said machine comprising a pair of relays, one of said relays being responsive to lagging current of said machine and operative to limit a decrease in excitation of said field winding, and the other of said relays being responsive to leading current of said machine and operative to limit an increase in excitation of said field winding.

8. In a regulator system, a power circuit, a synchronous condenser connected to said power circuit and having a field winding, a regulator for governing the excitation of said field winding in accordance with power-circuit conditions, and means responsive to a predetermined reactive power of said machine for limiting the range of excitation of said field winding.

9. In a regulator system, a power circuit, a synchronous condenser connected to said power circuit and having a field winding, a regulator for governing the excitation of said field winding in accordance with power-circuit conditions, and a pair of current regulators for said synchronous condenser for governing the excitation of said field winding in accordance with condenser conditions.

10. In a regulator system, a dynamo-electric machine having a field winding, a regulator for governing the excitation of said field winding, and load-limiting means for said machine, said load-limiting means comprising a pair of relays, one of said relays being operative to limit the decrease in excitation of said machine, and anti-hunting means for said relays.

11. In a regulator system, a dynamo-electric machine having a field winding, a regulator for governing the excitation of said field winding, load-limiting means comprising a pair of relays, means for energizing said relays in accordance with the conditions of said machine, and means for modifying the excitation of said relays in opposite directions to prevent hunting action of the system.

12. In a regulator system, a dynamo-electric machine having a field winding, a regulator for governing the excitation of said field winding comprising a pair of contact members, load-limiting means for said machine comprising a pair of relays, one of said relays being connected to control a circuit in parallel-circuit relation to said regulator contact members, and one of said relays being connected to interrupt the circuit through said regulator contact members, means for energizing said relays in accordance with conditions of said machine, and means for modifying the excitation of said relays in opposite directions to prevent hunting action of the system.

In testimony whereof, I have hereunto subscribed my name this 24th day of August, 1925.

JOHN H. ASHBAUGH.